No. 768,887. PATENTED AUG. 30, 1904.
D. W. STRICKLAND.
LUMBER WAGON.
APPLICATION FILED FEB. 12, 1904.
NO MODEL. 2 SHEETS—SHEET 1.
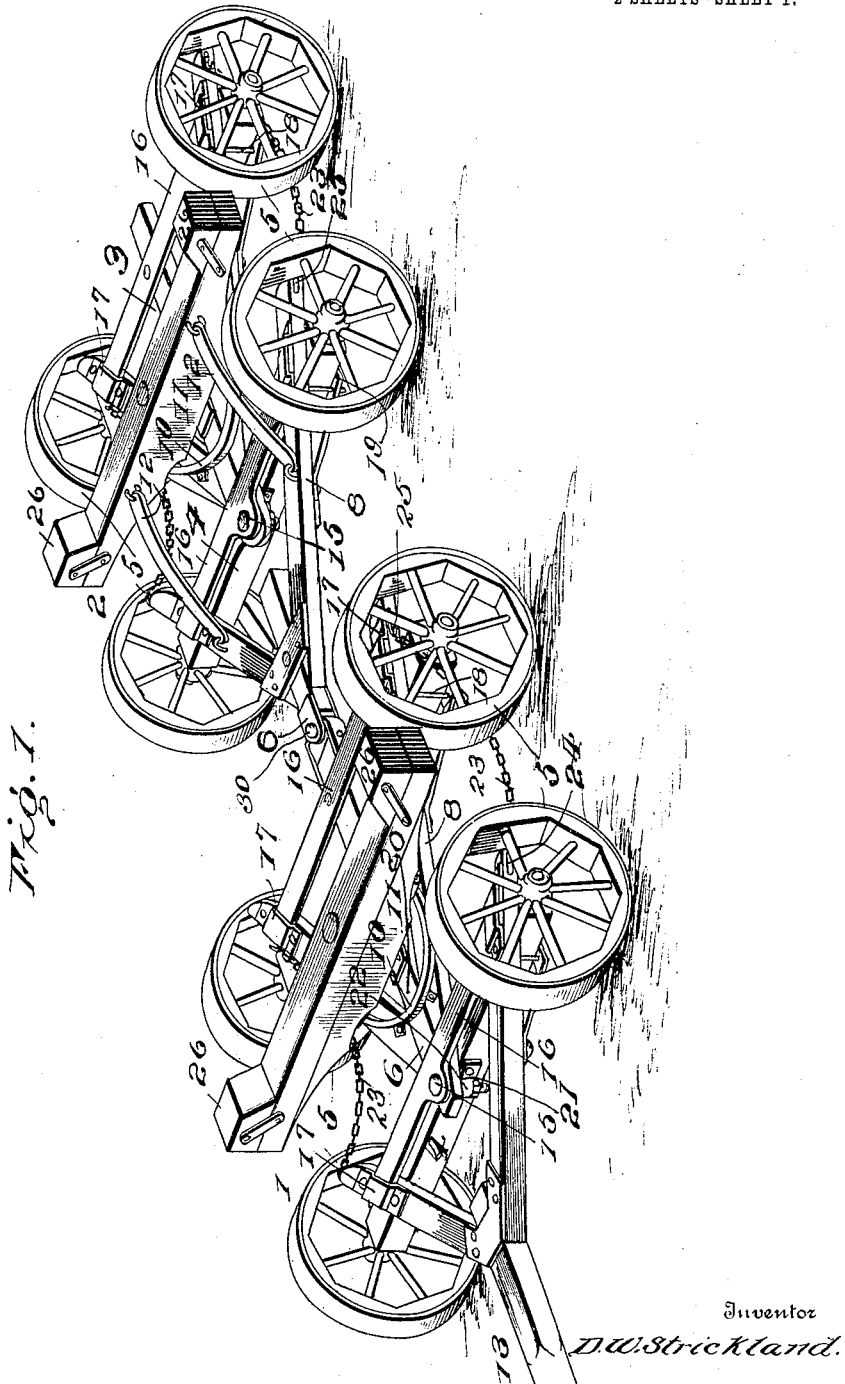
Witnesses
Inventor
D. W. Strickland.

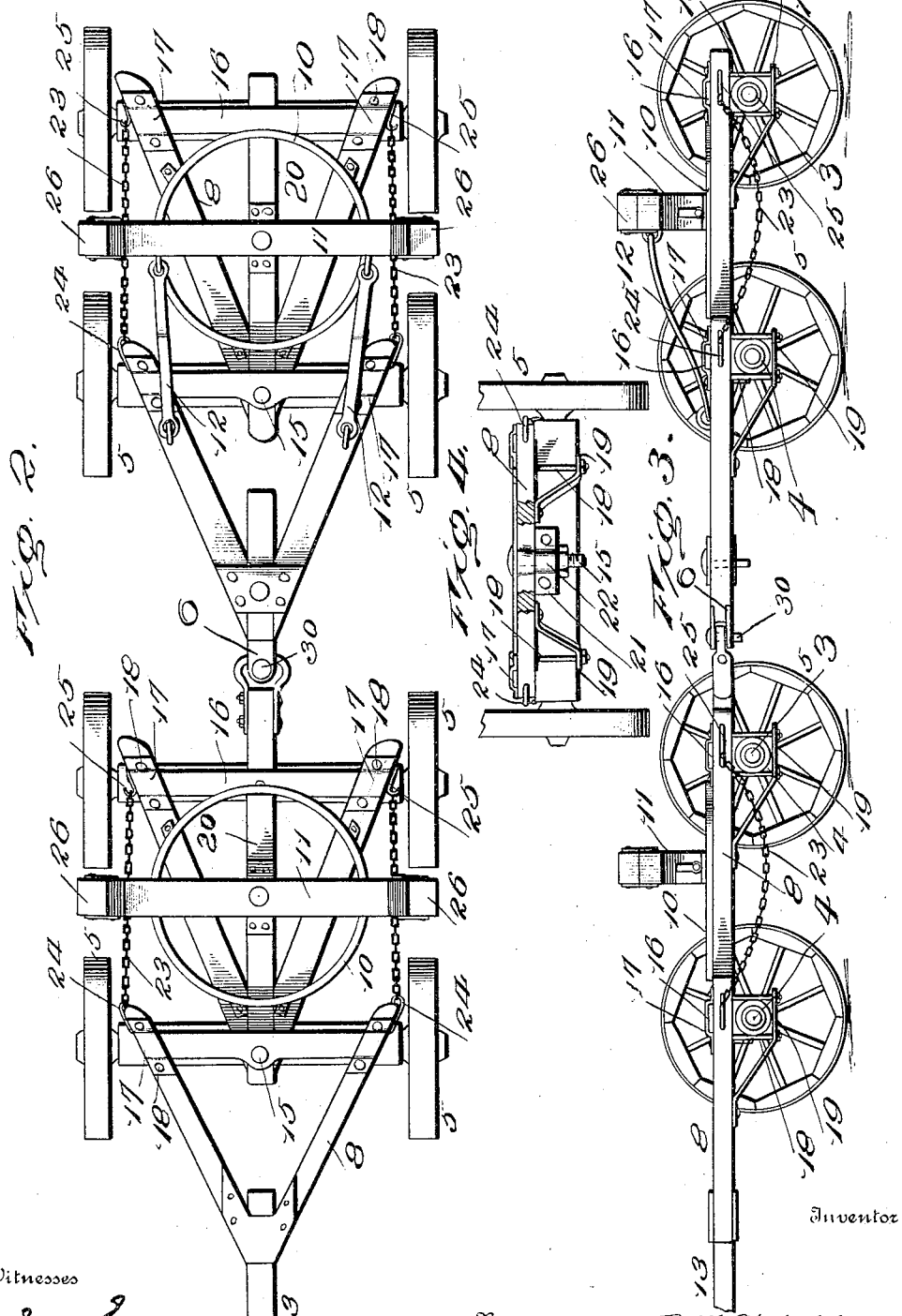

No. 768,887. Patented August 30, 1904.

UNITED STATES PATENT OFFICE.

DEWITT W. STRICKLAND, OF COLUMBIA, MISSISSIPPI, ASSIGNOR, BY MESNE ASSIGNMENTS, TO HATTIESBURG EIGHT WHEEL WAGON CO., OF HATTIESBURG, MISSISSIPPI.

LUMBER-WAGON.

SPECIFICATION forming part of Letters Patent No. 768,887, dated August 30, 1904.

Application filed February 12, 1904. Serial No. 193,266. (No model.)

*To all whom it may concern:*

Be it known that I, DEWITT W. STRICKLAND, a citizen of the United States, residing at Columbia, in the county of Marion and State of Mississippi, have invented certain new and useful Improvements in Lumber-Wagons, of which the following is a specification.

This invention provides improvements in that class of vehicles commonly styled "lumber-wagons" for use in conveying long pieces of timber, lumber, rails, or the like.

Various improvements in the general structure of the wagon are contemplated in my invention, the details of which will appear more fully hereinafter.

Vehicles of the type mentioned are usually composed of a plurality of double trucks pivotally connected together, said trucks being provided with supporting-bolsters upon which the load is directly received. The axles of the double trucks are usually pivoted together, and in view of such connection it is often very difficult, if not impossible, to back the wagon. It is therefore a further object of the invention to secure a means whereby backing or rearward movement of the vehicle may be readily permitted.

Another object of the invention is to provide a novel manner of pivotally connecting the several axles of each truck so as to afford a more substantial and rigid connection, as will be clearly pointed out as the description proceeds.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a perspective view showing a lumber-wagon constructed in accordance with my invention. Fig. 2 is a top plan view. Fig. 3 is a side elevation. Fig. 4 is a detail view enlarged, showing more clearly the pivotal connection of the axles of the respective trucks.

Corresponding and like parts are referred to in the following description and indicated in all the views of the drawings by the same reference characters.

Having reference to the drawings, the front and rear trucks comprising my wagon are designated by the numerals 1 and 2, respectively. Each of the trucks 1 and 2 consists of rear rigid axles 3 and front pivoted axles 4, which axles are connected together by pivotal means, such as the king-bolts 15. Ground-wheels 5 support the axles of the trucks 1 and 2, and the said trucks are connected by means of the reach 6, which reach 6 is pivotally connected at 30 to the bolster-beam 20 of the front truck. Hounds 8 are extended from each of the axles 3 and 4 of the trucks of the wagon, and the hounds are secured to the axles in a peculiar manner. Transverse plates 16 connect the rear ends of the hounds 8 of the trucks 1 and 2, the said plates being secured to the hounds by means of clamp-plates 17, which are secured to the axles, adjacent which the hound-plates 16 are mounted by means of spaced clamp-bolts 18. The clamp-bolts 18 embrace the axles upon opposite sides, said axles being received, in other words, between the clamp-bolts. The lower ends of the bolts extend through brace-plates 19, which are disposed underneath each of the hounds 8. Each of the brace-plates is secured at one end directly to a hound 8, the opposite end being clamped against the under side of an adjacent axle 3 or 4, as the case may be, by means of the clamp-bolts 18, as above mentioned. It will thus be noted that the plates 19 serve in the double capacity of brace means as well as clamp-plates. The hound-plates 16 may be secured intermediate their ends to the bolster-beams 20, which are located between the hounds by means of suitable fastenings. Upon the bolster-beams 20 are mounted the bolsters 11, pivotally positioned and coöperating with ordinary types of fifth-wheels 10.

It is a desideratum to obviate the use of the ordinary king-bolt opening for connecting the axles 3 and 4 of each truck together. With the above in view I secure to the front or rear sides of the corresponding front axles 4 of each truck king-bolt plates 21, which are provided with bearings 22 to receive the king-bolts 15, by which the hounds of the rear axles 3 are pivoted to the front axles 4. The plates 21 are secured in any substantial manner, and since said plates receive the king-bolt it will be seen that the necessity for a bolt-opening in the axles 4 is avoided. This bolt-opening tends to weaken the axle structure, hence the advantage in the above construction.

It is desirable to use in connection with my invention the link members 12, which connect the bolster 11 of the rear truck with the hounds 8 of the front axles of said truck, thereby causing the bolster to assume an ascertained position with relation to the said axles. The links are advantageously used in that the bolsters 11, upon which the load rests, are always restored to the same normal position after turning movement of the wagon. The lumber or rails, or whatever the load may be, are always held in a position longitudinally of the wagon as the same is advanced, and the load is always caused to resume such position after turning movement of the vehicle, under the actuation of the axle 4 of the rear truck.

In carrying out the feature of my invention relative to the provision of means for adapting the vehicle for movement rearwardly I utilize connections between the axles of each truck which are adapted for adjustment or detachment to limit the movement of the pivoted axles relative to the rigid axles or to permit entire independence of the movement of said axle. The connections aforesaid comprise chains 23, permanently attached to the rear ends of the hounds 8 of the front axles 4 or directly to said axles by means of eyebolts 24 or any similar fastenings 24. The opposite ends of the chains or connections 23 are detachably and adjustably secured to hooks 25 or similar devices, which are carried by the rear portions of the hounds 8 of the respective rear axles 3 of each truck or adjacent rigid portions of the truck. The hooks 25 are adapted to engage the links of the chains 23, so as to securely hold the said chain at any desired adjustment, permitting, of course, of ready detachment of these parts whenever desired. Whenever it is necessary to back the vehicle, it is essential that the axles of each truck 1 and 2 be rigidly connected together, so as to admit of a straight backward movement. To accomplish the above, the connections 23 are so attached to the hooks as to be taut, to thereby rigidly connect the axles of the trucks, preventing any pivotal movement of such axles relative to each other. When it is desired to advance the vehicle, the connections 23 should be so adjusted as to allow a certain amount of slack therein to admit of turning movement of the trucks, as will be obvious. The turning movement of the axles of the truck may be of course limited, as found most suitable in the practical use of the invention. In like manner the connections 23 may be entirely disengaged from the hooks 25 to permit independent movement of the axles.

Upon the bolsters 11 are disposed the adjustable bumpers or bolster-blocks 26, which are commonly employed for the purpose of keeping the load from lateral displacement. It will be understood that other suitable connections may be substituted for the specific type (designated 23) within the contemplation of my invention, and, further, that the detail structure, as hereinbefore described, may be departed from in accordance to the spirit of the invention, as indicated in the foregoing description.

Having thus described the invention, what is claimed as new is—

1. In a wagon, the combination of a truck having rigid and pivoted axles, and independent detachable connections between said rigid and pivoted axles to limit the movement of the pivoted axle, said connections having connection with the pivoted axle upon opposite sides of the point of pivotal support thereof.

2. In a wagon, the combination of an axle, hounds extended from said axle and supported thereby, hound-plates connecting the rear end portions of the hounds aforesaid, brace-plates secured at corresponding ends to the hounds, the other ends of the brace-plates being disposed beneath the axle, clamp-plates engaging the end portions of the hound-plates, and fastening-bolts embracing the axle upon opposite sides and passing through the hounds, clamp-plates, and brace-plates securing said parts together.

3. In a wagon, the combination with double trucks, of axles, hounds projected from the rear axles of each truck and pivotally connected to the front axles of each truck, other hounds extended from the respective front axles of each truck, eyebolts secured to the rear ends of the hounds of the front axles of the trucks, hooks projected from the rear end portions of the hounds of the rear axles of each truck, and connections between the eyebolts and hooks of the hounds of the respective trucks.

In testimony whereof I affix my signature in presence of two witnesses.

DEWITT W. STRICKLAND. [L. S.]

Witnesses:
  H. B. WELLBORN,
  CHAS. FOXWORTH, Jr.